United States Patent

Jain et al.

(10) Patent No.: US 11,913,894 B2
(45) Date of Patent: Feb. 27, 2024

(54) DYNAMIC SURFACE PROFILE CHANGE IN DEVICE FOR BETTER GRIPPING

(71) Applicant: KYNDRYL, INC., New York, NY (US)

(72) Inventors: Prashant Jain, Singapore (SG); Sarbajit K. Rakshit, Kolkata (IN); Ai Kiar Ang, Anchorvale Link (SG); Rambabu Parvatina, Singapore (SG); Gary Kim Chwee Lim, Singapore (SG); Chia Eng Yeo, Singapore (SG)

(73) Assignee: KYNDRYL, INC., New York, NY (US)

( * ) Notice: Subject to any disclaimer, the term of this patent is extended or adjusted under 35 U.S.C. 154(b) by 355 days.

(21) Appl. No.: 17/115,711

(22) Filed: Dec. 8, 2020

(65) Prior Publication Data

US 2022/0178860 A1    Jun. 9, 2022

(51) Int. Cl.
| | |
|---|---|
| *G01N 27/12* | (2006.01) |
| *H04M 1/02* | (2006.01) |
| *G01N 27/22* | (2006.01) |
| *G06F 11/07* | (2006.01) |
| *G06F 3/00* | (2006.01) |

(52) U.S. Cl.
CPC ......... *G01N 27/121* (2013.01); *G01N 27/223* (2013.01); *G06F 3/00* (2013.01); *G06F 11/0742* (2013.01); *H04M 1/0279* (2013.01)

(58) Field of Classification Search
CPC ...... G01N 27/121; G01N 27/223; G06F 3/00; G06F 11/0742; H04M 1/0279
See application file for complete search history.

(56) References Cited

U.S. PATENT DOCUMENTS

| | | | |
|---|---|---|---|
| 9,274,612 B2 | 3/2016 | Ciesla | |
| 9,541,993 B2 | 1/2017 | Balasundaram | |
| 9,764,505 B2 * | 9/2017 | Guenther | C12M 23/16 |
| 10,777,729 B2 * | 9/2020 | Gdala | G06F 3/0443 |
| 2009/0250267 A1 * | 10/2009 | Heubel | G06F 3/041 |
| | | | 178/18.03 |

(Continued)

FOREIGN PATENT DOCUMENTS

| | | | |
|---|---|---|---|
| EP | 1601874 B1 | 12/2005 | |
| WO | WO-2019041955 A1 * | 3/2019 | B01L 3/5027 |

OTHER PUBLICATIONS

Guttag et al., "Locally and Dynamically Controllable Surface Topography Through the Use of Particle-Enhanced Soft Composites", Advanced Functional Materials Journal,. 2015, 25, 3641-3647 (Year: 2015).*

(Continued)

*Primary Examiner* — Farhana A Hoque
*Assistant Examiner* — Dilara Sultana
(74) *Attorney, Agent, or Firm* — Dan Housley; Andrew M. Calderon; Calderon Safran & Cole P.C

(57) ABSTRACT

A method comprises receiving moisture sensor data from at least one moisture sensor located in a device. The at least one moisture sensor is configured to detect moisture on a surface of the device. The method also comprises determining a likelihood of the device slipping from a grip of a user based on the received moisture sensor data; and altering a surface profile of a surface panel of the device based on the determined likelihood of the device slipping from the grip of the user.

20 Claims, 5 Drawing Sheets

(56) References Cited

U.S. PATENT DOCUMENTS

2017/0285749 A1* 10/2017 Lawrenson ....... H04M 1/72454
2019/0268461 A1*  8/2019 Ai ..................... H04M 1/72454
2019/0289105 A1   9/2019 Smith
2020/0167434 A1   5/2020 Rakshit

OTHER PUBLICATIONS

Anonymous, "Personalizing and improving accessibility based on the user's holding pattern of mobile devices," IP.com, Disclosure No. IPCOM000262531D, Jun. 9, 2020, 4 pages. <https://priorart.ip.com/IPCOM/000262531>.

Chandler, "Surfaces get smooth or bumpy on demand," MIT News, Jun. 11, 2015, 4 pages. <https://news.mit.edu/2015/controllable-surface-textures-0611>.

Goel et al., "GripSense: Using Built-In Sensors to Detect Hand Posture and Pressure on Commodity Mobile Phones," Proceedings of the 25th annual ACM symposium on User interface software and technology (UIST '12), Oct. 7-10, 2012, pp. 545-554.

* cited by examiner

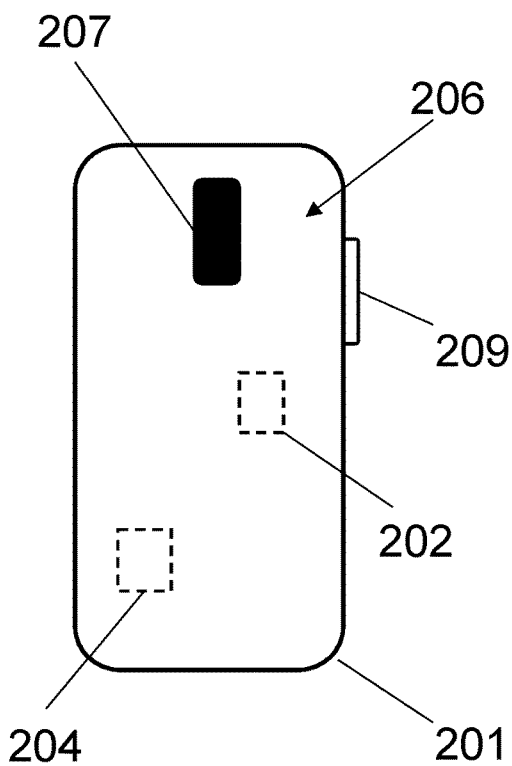
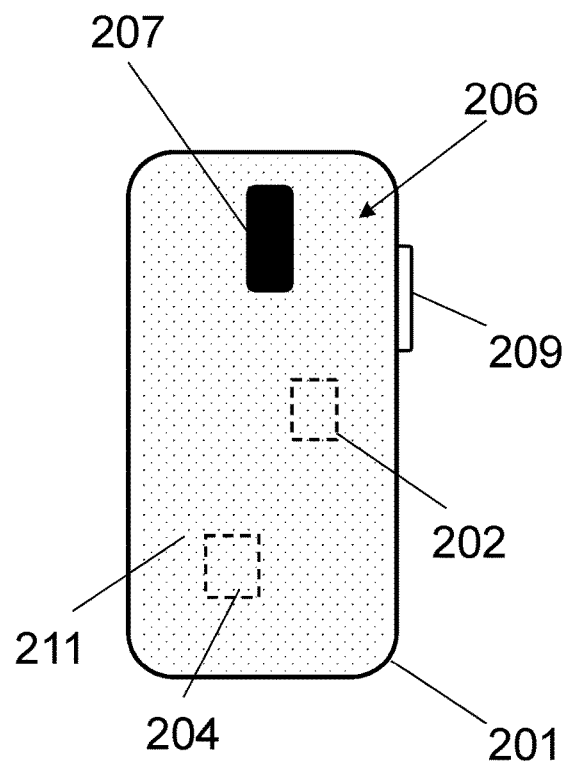
FIG. 2A
FIG. 2B
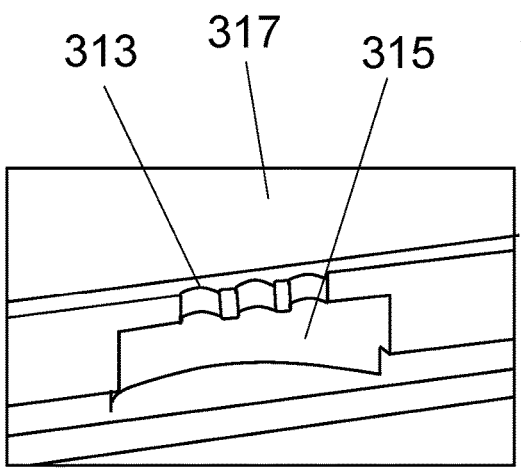
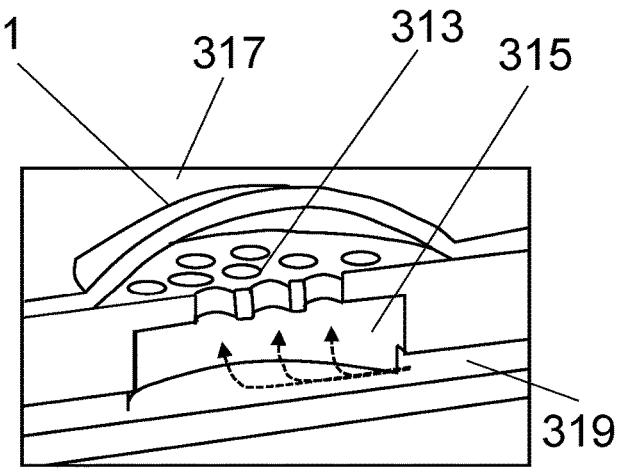
FIG. 3A
FIG. 3B

DYNAMIC SURFACE PROFILE CHANGE IN DEVICE FOR BETTER GRIPPING

BACKGROUND

Increasingly, manufacturers of mobile devices are using glass for the body of the mobile device. Using glass may give the devices a premium look. In addition, using glass provides some technical advantages when it comes to signal reception and wireless charging. However, as a result of using these materials, the mobile device surface can become slippery which can be a challenge as it is easy to drop the device especially when the hands are wet, or while operating the device under water. Several third-party providers manufacture external cases for these mobile devices to provide a better grip. However, these cases may add weight and make the device bulky to carry. Also, they alter the look of the device which can make them less desirable.

SUMMARY

Aspects of the disclosure may include a computer-implemented method, computer program product, and system. One example of the method comprises receiving moisture sensor data from at least one moisture sensor located in a device. The at least one moisture sensor is configured to detect moisture on a surface of the device. The method also comprises determining a likelihood of the device slipping from a grip of a user based on the received moisture sensor data; and altering a surface profile of a surface panel of the device based on the determined likelihood of the device slipping from the grip of the user.

DRAWINGS

Understanding that the drawings depict only exemplary embodiments and are not therefore to be considered limiting in scope, the exemplary embodiments will be described with additional specificity and detail through the use of the accompanying drawings, in which:

FIGS. 2A and 2B depict one embodiment of an example device implementing a dynamic surface profile changing system.

FIGS. 3A and 3B depict a portion of one embodiment of an example microfluidic panel.

Figure 1:
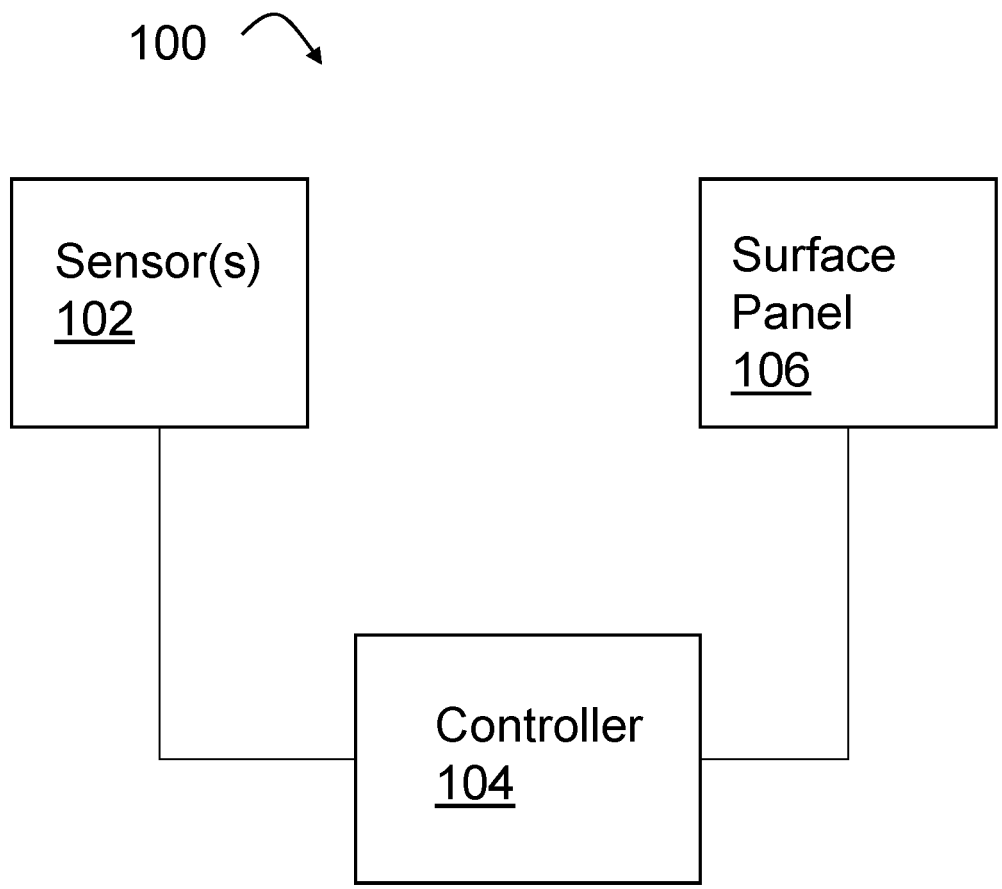
FIG. 1 is a block diagram depicting one embodiment of an example dynamic surface profile changing system.

In accordance with common practice, the various described features are not drawn to scale but are drawn to emphasize specific features relevant to the exemplary embodiments.

DETAILED DESCRIPTION

In the following detailed description, reference is made to the accompanying drawings that form a part hereof, and in which is shown by way of illustration specific illustrative embodiments. However, it is to be understood that other embodiments may be utilized and that logical, mechanical, and electrical changes may be made. Furthermore, the method presented in the drawing figures and the specification is not to be construed as limiting the order in which the individual steps may be performed. The following detailed description is, therefore, not to be taken in a limiting sense.

As used herein, "a number of" when used with reference items, means one or more items. For example, "a number of different types of networks" is one or more different types of networks.

Further, the phrases "at least one", "one or more," and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together. In other words, "at least one of", "one or more of", and "and/or" mean any combination of items and number of items may be used from the list, but not all of the items in the list are required. The item may be a particular object, a thing, or a category. Additionally, the amount or number of each item in a combination of the listed items need not be the same. For example, in some illustrative examples, "at least one of A, B, and C" may be, for example, without limitation, two of item A; one of item B; and ten of item C; or 0 of item A; four of item B and seven of item C; or other suitable combinations.

Additionally, the term "a" or "an" entity refers to one or more of that entity. As such, the terms "a" (or "an"), "one or more" and "at least one" can be used interchangeably herein. It is also to be noted that the terms "comprising," "including," and "having" can be used interchangeably.

Furthermore, the term "automatic" and variations thereof, as used herein, refers to any process or operation done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material."

As discussed above, a mobile device with a body of glass or metal such as aluminum can be slippery to hold, especially when a user handles the device with wet or sweaty hands. In addition, if the mobile device is used underwater for taking pictures or videos, the device may again be difficult to hold or get a good grip. Furthermore, the grip pattern of the user may also increase the chance that the device may slip (e.g. not gripping or applying pressure sufficiently). The embodiments described herein enable the mobile device to identify if slipping is likely, such as by being held by wet or sweaty hands or fingers, insufficient grip pattern and/or or if the device itself is underwater. In response to such a determination, the mobile device is configured to dynamically change or alter the surface profile of the mobile device such that it becomes coarse. By increasing the coarseness of the surface profile, the embodiments described herein enable a user to get a better grip on the device and reduce the likelihood of a situation where the mobile device may slip and fall. It is to be understood that although the embodiments below are described with respect to mobile devices for purposes of explanation, the present invention is not to be so limited. In particular, in other embodiments, the dynamic surface profile changing system can be implemented in other devices/objects, such as, but not limited to, pot handles, small kitchen appliances, gardening tools, etc. which can become slippery when wet and/or are not gripped sufficiently.

FIG. 1 is a high-level block diagram of one embodiment of an example dynamic surface profile changing system 100. The system 100 includes one or more sensors 102, a controller 104, and a surface panel 106. In some embodiments, one or more of the sensors 102 is a fluid sensor configured to detect liquids on the surface of a device. In the presence of liquids (e.g. sweat, water, etc.) on the surface of the device, a signal is sent from the one or more sensors 102 to the controller 104. In addition to detecting the presence of liquids, in some embodiments, the one or more fluid sensors can also output a signal indicating a relative amount of liquid detected on a surface of the device. In addition, in some embodiments, one or more of the sensors 102 is a pressure sensor configured to detect pressure applied to a surface of the device. In particular, one or more pressure sensors can detect both a strength of grip applied by the user as well as the location or points at which the user is gripping the device. Data from the pressure sensors 102 is sent to the controller 104 for further analysis in detecting a likelihood of the device slipping.

The controller 104 uses the data from the one or more fluid sensors 102 and/or the one or more pressure sensors 102 to determine a likelihood of the device slipping from the user's grip. For example, the controller 104 can utilize machine learning techniques, in some embodiments, to compare data regarding the detected liquid from one or more liquid sensors and/or grip pattern data from one or more pressure sensors to determine a likelihood of the phone slipping. Example machine learning techniques can comprise algorithms or models that are generated by performing supervised, unsupervised, or semi-supervised training on a dataset. Machine learning algorithms can include, but are not limited to, decision tree learning, association rule learning, artificial neural networks, deep learning, inductive logic programming, support vector machines, clustering, Bayesian networks, reinforcement learning, representation learning, similarity/metric training, sparse dictionary learning, genetic algorithms, rule-based learning, and/or other machine learning techniques.

For example, the machine learning algorithms can utilize one or more of the following example techniques: K-nearest neighbor (KNN), learning vector quantization (LVQ), self-organizing map (SOM), logistic regression, ordinary least squares regression (OLSR), linear regression, stepwise regression, multivariate adaptive regression spline (MARS), ridge regression, least absolute shrinkage and selection operator (LASSO), elastic net, least-angle regression (LARS), probabilistic classifier, naïve Bayes classifier, binary classifier, linear classifier, hierarchical classifier, canonical correlation analysis (CCA), factor analysis, independent component analysis (ICA), linear discriminant analysis (LDA), multidimensional scaling (MDS), non-negative metric factorization (NMF), partial least squares regression (PLSR), principal component analysis (PCA), principal component regression (PCR), Sammon mapping, t-distributed stochastic neighbor embedding (t-SNE), bootstrap aggregating, ensemble averaging, gradient boosted decision tree (GBRT), gradient boosting machine (GBM), inductive bias algorithms, Q-learning, state-action-reward-state-action (SARSA), temporal difference (TD) learning, a priori algorithms, equivalence class transformation (ECLAT) algorithms, Gaussian process regression, gene expression programming, group method of data handling (GMDH), inductive logic programming, instance-based learning, logistic model trees, information fuzzy networks (IFN), hidden Markov models, Gaussian naïve Bayes, multinomial naïve Bayes, averaged one-dependence estimators (AODE), Bayesian network (BN), classification and regression tree (CART), chi-squared automatic interaction detection (CHAID), expectation-maximization algorithm, feed-forward neural networks, logic learning machine, self-organizing map, single-linkage clustering, fuzzy clustering, hierarchical clustering, Boltzmann machines, convolutional neural networks, recurrent neural networks, hierarchical temporal memory (HTM), and/or other machine learning techniques.

Additionally, the controller 104 can store a history of liquid data and grip data as a factor in determining a likelihood of the device slipping. For example, the controller 104 can compare current liquid data from liquid sensors 102 and current pressure from pressure sensors 102 to historical data to determine a likelihood of the device slipping. In some embodiments, the determination is a binary decision, i.e. the device is likely to slip or the device is not likely to slip. In other embodiments, the determination can have a range of scores indicating increasing/decreasing likelihood of slipping. For example, a scale of 1-10, 1-100, or any other suitable range can be used to indicate relative likelihood of the device slipping. In some such examples, the lowest number indicates the least likelihood of the device slipping and the highest number indicates the highest likelihood of the device slipping.

Based on the determination of the likelihood of the device slipping, the controller 104 activates the surface panel 106 to change the surface profile of the surface panel 106. For example, in some embodiments, the surface panel 106 is a microfluidic panel. Although the embodiments described herein refer to a microfluidic panel for purposes of explanation, it is to be understood that other materials can be used in other embodiments. For example, in some embodiments, a polymer material comprised of different polymers, each polymer having its own stiffness. Such a polymer material can include stiffer particles embedded within relatively softer particles such that when pressure is applied to the polymer material the surface profile of the polymer changes. In some such embodiments, the controller 104 can send a signal causing pressure to be applied to the material such that the surface profile of the material changes in a predetermined pattern based on the stiffer embedded particles.

With respect to embodiments implementing a microfluidic panel, the controller 104 causes the microfluidic panel to disperse a fluid in the panel which causes the surface profile of the panel 106 to alter, as discussed in more detail below with respect to FIGS. 3A and 3B. In some embodiments, the surface panel 106 can be configured with two states: a smooth state and a rough state having bumps to increase coarseness and grip. In other embodiments, the surface panel 106 can have varying degrees of smoothness and roughness. For example, in some embodiments, with a range of likelihood of slipping, varying degrees of smoothness/roughness can be associated with values in the range of likelihood of slipping. As an example, for a low likelihood of slipping, e.g. less than 33 percent, the surface panel 106 can have a smooth surface, for a moderate likelihood of slipping, e.g. between 33 and 66 percent, the controller 104 can cause the surface panel 106 to disperse a first amount of fluid to have a first number of bumps and or size of bumps in the surface panel 106, and for a high likelihood of slipping, e.g. greater than 66 percent, the controller 104 can cause a second amount of fluid to be dispersed in a microfluidic panel to increase the number of bumps and/or the size of the bumps in the surface of the microfluidic panel. It is to be understood that the percent ranges presented above are provided by way of example only and that the specific values as well as the number of different ranges can be different in other embodiments.

Additionally, in some embodiments, the controller 104 can cause the surface panel 106 to alter the surface profile of the surface panel 106 to a first coarseness level. Then, in response to subsequent data from sensors 102, the controller 104 can cause the surface panel 106 to alter the surface profile of the surface panel 106 to a second coarseness level. For example, the controller can determine that the surface profile should be altered based on sensor data indicating presence of liquid and a relatively light grip. The controller 104 continues to monitor sensor data after causing the surface panel 106 to alter its surface profile. If the controller determines that additional liquid has been detected or that the user grip on the device has lessened, for example, the controller 104 can cause the degree of coarseness in the surface profile of the surface panel 106 to increase. Thus, the sensor data provides a feedback loop to the controller 104 to alter the surface profile of the surface panel 106 in response to changes in the environment and grip detected by the sensors 102.

The controller 104 can be implemented as a processing unit executing instructions, such as a processing unit of a mobile device. An example controller 104 comprising a processing unit executing instructions is discussed in more detail with respect to FIG. 5. In other embodiments, in lieu of or in addition to being implemented in a processor-based system, the controller 104 can be implemented through other circuitry. For example, in some embodiments, the controller 104 can be implemented as a field programmable gate array (FPGA), application specific integrated circuit (ASIC), or other hardware logic circuits configured to control the release of fluid in the microfluidic panel 106 in response to analysis of signals from the sensors 102.

FIGS. 2A and 2B depict one embodiment of an example device 201 implementing a dynamic surface profile changing system such as system 100. The device 201 in this example is a mobile phone and includes one or more buttons 209 (e.g. power and/or volume control buttons), one or more cameras 207, one or more sensors 202, a controller 204, and a microfluidic panel 206 embedded in a back of the device 201. The sensors 202 can be integrated within a surface of the panel 206 to detect moisture or the presence of liquids on the surface of the panel 206. Additionally, the sensors 202 can be located at various locations throughout the device 201. Furthermore, one or more of the sensors 202 can be configured to detect pressure as well in order to provide grip data, as discussed above. As shown in FIG. 2A, the default configuration of the microfluidic panel is a relatively smooth surface. The controller 204 analyzes data from the sensors 202 (e.g. moisture detection and/or pressure detection) to determine a likelihood of the device 201 slipping from a grip of a user. In response to determining the likelihood of slipping, such as due to detection of liquid and/or grip of the user, the controller 204 causes the microfluidic panel 206 to release fluid within the panel 206 to alter the surface profile such that it includes bumps 211 which help create a rougher surface compared to the default smooth surface in order to create more grip on the surface of the device 201. These bumps 211 help enable a user to grip the device and reduce the likelihood of the device slipping.

FIGS. 3A and 3B depict a portion of one embodiment of an example microfluidic panel. As depicted in FIGS. 3A and 3B, the microfluidic panel includes a flexible surface material 317, a cavity 315, and one or more channels 313. FIG. 3A depicts a default state of the microfluidic panel in which the surface profile of the surface material 317 is relatively smooth. FIG. 3B depicts a second state of the microfluidic panel in which the surface profile of the surface material 317 of the microfluidic panel has altered to form a bump 311. In particular, a fluid is released through pipes/tubes 319 into the cavity 315. When in the default state, the fluid can be stored in one or more reservoirs. For example, in some embodiments, the one or more reservoirs can be located along an edge of the microfluidic panel. The fluid passes from the cavity 315 through the channels 313 to push against the flexible surface 317 and create a bump 311. The amount of fluid release can be controlled by the controller, e.g. controller 104, to vary the size of the bump 311 and/or the number of bumps present in the microfluidic panel.

Thus, a mobile device can have moisture/water sensors and/or pressure sensors, such as sensors 102. The sensors track if any moisture/water comes in contact with the mobile device. Furthermore, as stated above, in some embodiments, the identification of moisture/water is binary. That is, either moisture/water is present or moisture/water is not detected. In such embodiments, the microfluidic panel can have 2 states corresponding to a relatively smooth surface profile and a relatively rough surface profile. In other embodiments, the degree of moisture is tracked. For example, if the mobile device is submerged in water then the degree of moisture/water is at a maximum. Thus, the microfluidic panel can have more than two states with different surface profiles corresponding to each state such that the roughness of the microfluidic panel can alter in varying degrees according to the degree of moisture tracked. In addition, other sensors can be used in addition to or in lieu of the moisture sensors in some embodiments to determine how to alter the surface profile of the microfluidic panel. For example, images from a mobile device camera can be analyzed by a processor to detect if the device is submerged in water. Accordingly, based on the data from the mobile device camera, the surface profile of the device can be altered, as described herein, to help maintain the user grip of the device. Additionally, as discussed above, in some embodiments, the mobile device includes one or more pressure sensors configured to track a holding/grip pattern of the user which will determine the strength of the grip and the likelihood of the device slipping from the user's hand. The holding pattern of the mobile device can be tracked and compared with historical data and knowledge corpus to identify the types of holding pattern that are secure. For example, the mobile device can detect when it has slipped, (e.g. through the use of sensors such as accelerometers, gyroscopes, etc.) and the conditions that led to the slipping (e.g. through additional sensors, such as pressure sensors, moisture sensors, etc.).

In some embodiments, the user is alerted when any slippage is detected as indicated by reduced user grip along with the presence of moisture/water. The user's feedback can be used as training data to make the system more responsive and reliable. Thus, by using historical data and machine learning techniques, the mobile device is able identify when gripping of the mobile device is poor and might cause the mobile device to slip. Thus, in some embodiments, the system detects that the mobile device may slip from a user's hand through a combination of sensing moisture/water on the surface as well as the user's grip pattern. Once the system detects that the mobile device may slip, the controller causes the microfluidic panel to release the fluid, which will raise the surface of the mobile device, making it coarse and easier to grip. That is, in response to determining that the mobile device might slip, the mobile device activates the microfluidic panel to raise the surface by controlling the release of the fluid from an array of microfluidic ports which will improve the ability of the user to grip the device. In some embodiments, the level of coarseness can be controlled based on the data provided by the moisture and pressure sensors. In addition, historical data can be used to determine the level of coarseness based on user holding pattern.

Figures 4A, 4B:
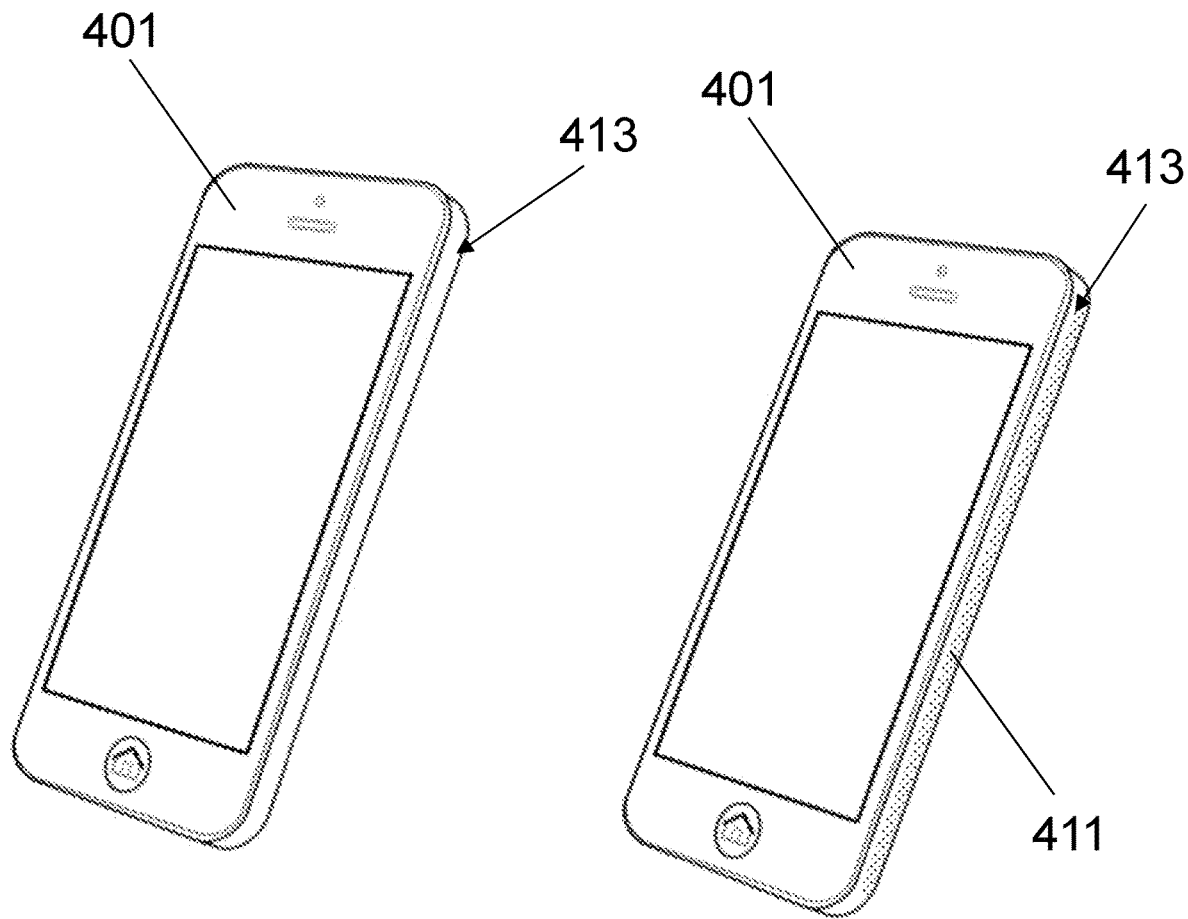
FIGS. 4A and 4B depict another embodiment of an example device implementing a dynamic surface profile changing system.

It is to be understood that the system can be implemented differently in different embodiments. For example, in FIGS. 4A and 4B, a device 401 is implemented with a microfluidic panel embedded in a side 413 of the device 401 in addition to or in lieu of implementing the microfluidic panel in a back of the device, as depicted in FIGS. 2A and 2B. In addition, embodiments of the system can be implemented in devices other than mobile devices in other embodiments, as discussed above. For example, an IOT-enabled frying pan or a kitchen blender can have sensors that detect wet or oily hands as well as pressure by which they are being held. Based on the holding pattern, slippage can be detected as indicated by reduced user grip along with the presence of moisture/water. The holding surface area of the object (e.g. handle of the frying pan or the base of the blender) can incorporate a microfluidic panel or a special polymer material that allows variability in the stiffness or coarseness of the surface area, as discussed above. For example, as discussed above, some conventional materials have been developed whose surface changes from smooth to a pattern determined by the spacing and shapes of the implanted particles in the material.

In some implementations of the system discussed herein, a spring-controlled or piezoelectric controlled pressure creation module can be placed within or on such a polymer material mentioned above. The system can detect that the object may slip from a user's hand through a combination of sensing moisture or oil on the surface as well as the user's grip pattern. Once the system detects that the object may slip, it will send a signal to the pressure creation module. Once the pressure is created, the polymer material mentioned above becomes coarse and bumpy, making it easier to grip the object. Thus, the embodiments described herein are not limited to mobile devices but can be used to dynamically change the surface profile of several everyday use objects that may be difficult to handle when the surface of the objects or the user's hands become wet or oily. Furthermore, as discussed above, the embodiments described herein are not limited to the use of microfluidic panels but can be implemented using other materials capable of having the surface profile dynamically altered.

Figure 5:
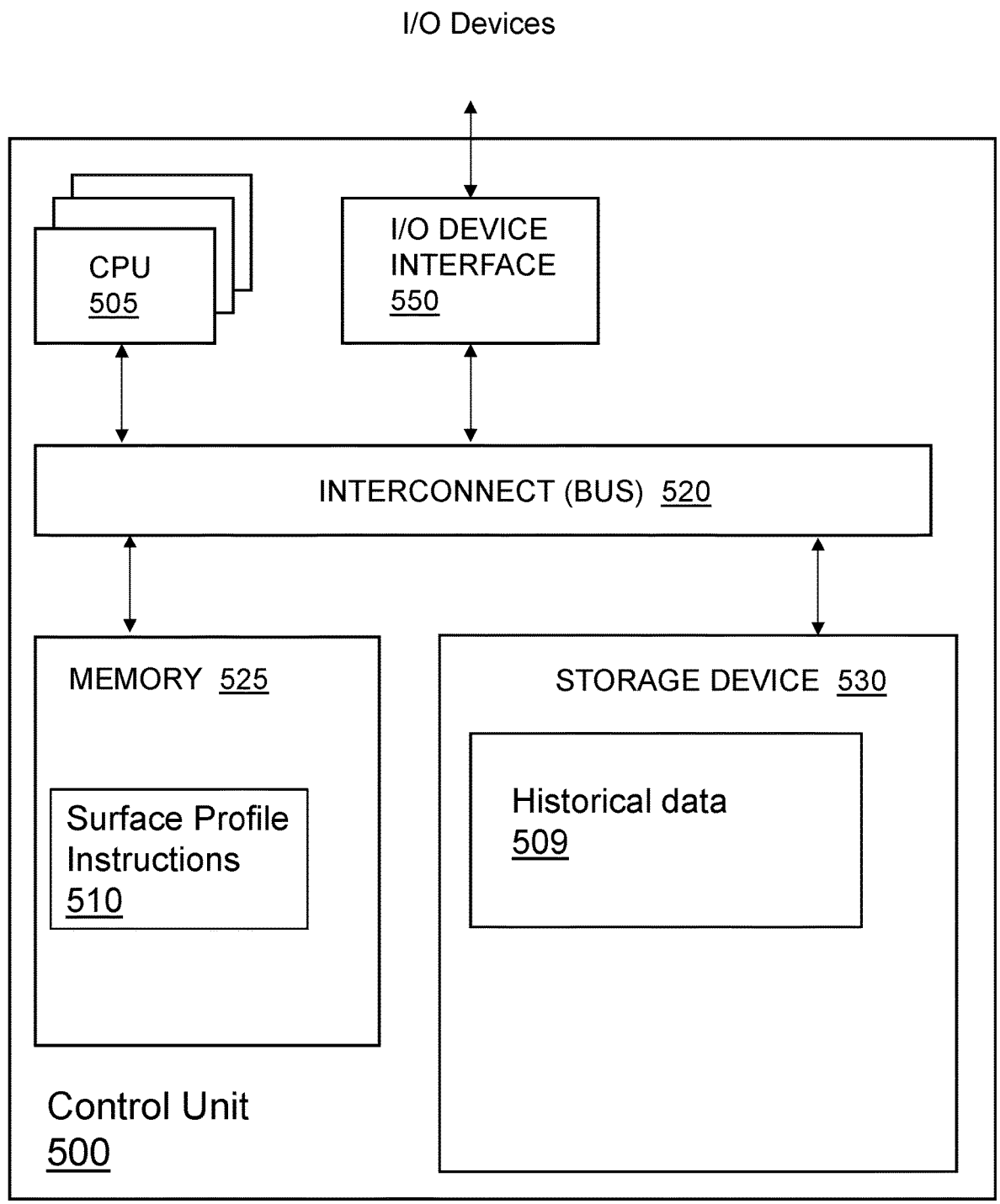
FIG. 5 is a high-level block diagram of one embodiment of an example controller.

FIG. 5 is a high-level block diagram of one embodiment of an example controller 500. The controller 500 can be implemented as controller 104 in FIG. 1. In the example shown in FIG. 5, the controller 500 includes a memory 525, storage 530, one or more processors 505 (also referred to as CPU 505 herein), and an input/output (I/O) device interface 550 communicatively coupled via an interconnect (e.g., BUS) 520. It is to be understood that the controller 500 is provided by way of example only and that the controller 500 can be implemented differently in other embodiments. For example, in other embodiments, some of the components shown in FIG. 5 can be omitted and/or other components can be included.

The I/O device interface 550 supports the attachment of one or more user I/O devices, which may include user output devices and user input devices (such as a keyboard, mouse, keypad, touchpad, trackball, buttons, light pen, or other pointing devices). A user can manipulate the user input devices using a user interface, in order to provide input data and commands to the user I/O device interface 550. Furthermore, the I/O device 550 is configured to receive data from one or more sensors, such as sensors 102 discussed above, and to output commands from the CPU 505 to a surface panel, such as surface panel 106 discussed above.

Each CPU 505 retrieves and executes programming instructions stored in the memory 525 and/or storage 530. The interconnect 520 is used to move data, such as programming instructions, between the CPU 505, storage 530, and memory 525. The interconnect 520 can be implemented using one or more busses. The CPUs 505 can be a single CPU, multiple CPUs, or a single CPU having multiple processing cores in various embodiments. In some embodiments, a processor 505 can be a digital signal processor (DSP).

Memory 525 is generally included to be representative of a random access memory (e.g., static random access memory (SRAM), dynamic random access memory (DRAM), or Flash). The storage 530 is generally included to be representative of a non-volatile memory, such as a hard disk drive, solid state device (SSD), removable memory cards, optical storage, or flash memory devices. Additionally, in some embodiments, the memory 525 stores surface profile instructions 510 and the storage 530 stores historical data 509. However, in other embodiments, the surface profile instructions 510 and historical data 509 stored partially in memory 525 and partially in storage 530, or they are stored entirely in memory 525 or entirely in storage 530. Additionally, although storage 530 is depicted as a single monolithic entity and the memory 525 is depicted as a single monolithic entity, it is to be understood that, in other embodiments, the storage 530 and/or the memory 525 can each be comprised of a plurality of separate memory devices.

When executed by the CPU 505, the surface profile instructions 510 cause the CPU 505 to perform a method such as method 600 discussed below. In particular, the surface profile instructions 510 cause the CPU 505 to perform the functionality of controller 104 discussed above, such as determining a likelihood of the device slipping based on moisture and/or pressure sensor data, and causing a surface panel to change its surface profile in response to the determined likelihood of the device slipping.

Furthermore, as discussed above, in some embodiments, one or more of the components and data shown in FIG. 5 include instructions or statements that execute on the processor 505 or instructions or statements that are interpreted by instructions or statements that execute on the processor 505 to carry out the functions as described herein. In other embodiments, one or more of the components shown in FIG. 5 are implemented in hardware via semiconductor devices, chips, logical gates, circuits, circuit cards, and/or other physical hardware devices in lieu of, or in addition to, a processor-based system.

Figure 6:
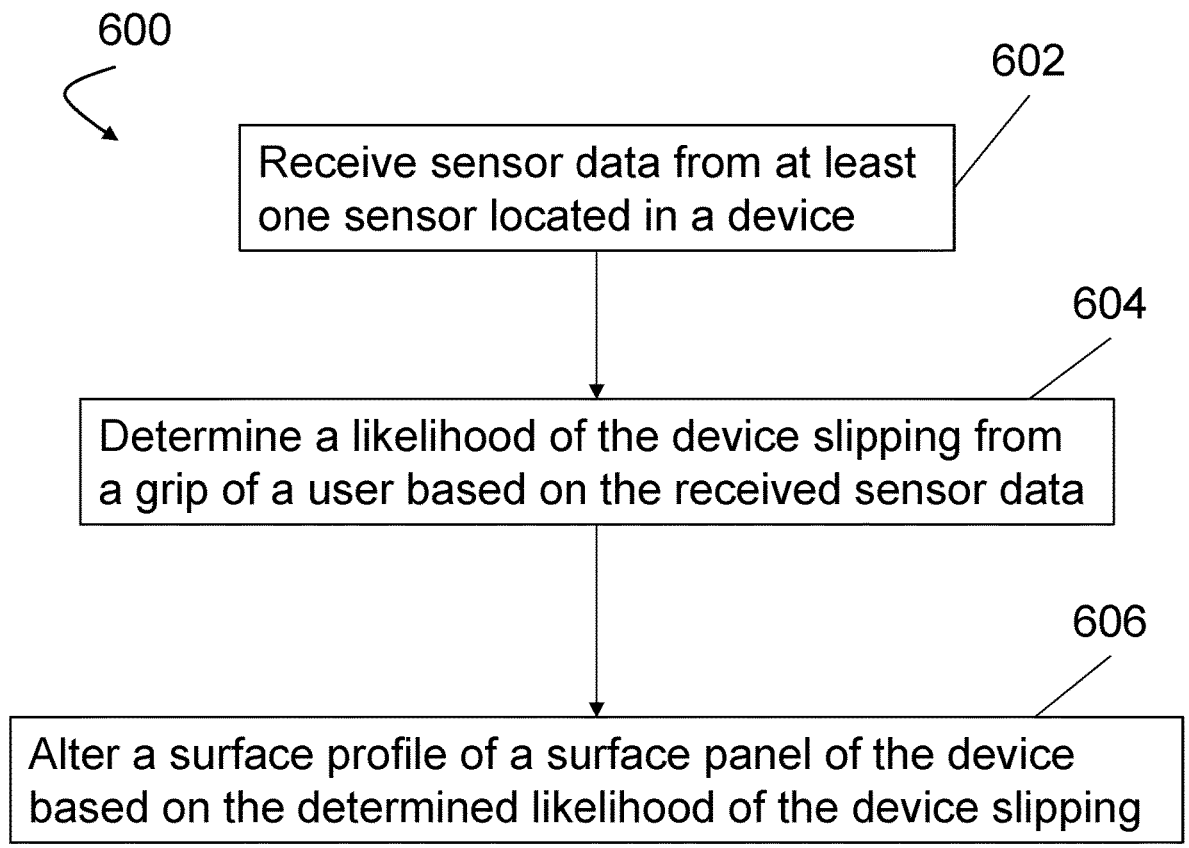
FIG. 6 is a flow chart depicting one embodiment of an example method of dynamically changing a surface profile of a device.

FIG. 6 is a flow chart depicting one embodiment of an example method 600 of dynamically changing a surface profile of a device. The method 600 can be implemented by a controller, such as controller 104. For example, the method 600 can be implemented by a CPU, such as CPU 505 in controller 500, executing instructions, such as surface profile instructions 510. It is to be understood that the order of actions in example method 600 is provided for purposes of explanation and that the method can be performed in a different order in other embodiments. Similarly, it is to be understood that some actions can be omitted or additional actions can be included in other embodiments.

At 602, sensor data from at least one sensor located in a device is received. As stated above, the device can be a mobile phone, a tablet, or other handheld electronic device. Alternatively, the device can also be implemented as other typically non-electronic handheld devices such as a frying pan, blender, saw, etc. which can slip from a user's grip when wet and/or otherwise not gripped sufficiently or properly by the user. Additionally, as discussed above, at least one sensor can include one or more moisture sensors configured to detect moisture on a surface of the device and/or one or more pressure sensors configured to detect a grip pattern of the user.

At 604, the sensor data is analyzed to determine a likelihood of the device slipping from a grip of the user. In some embodiments, this can be a binary decision. That is it is either likely that the device will slip or it is not. In other embodiments, determination can be on a scale, as discussed above, of relative likelihood of slipping. Furthermore, in some embodiments, a controller can implement machine learning techniques to analyze the sensor data and correlate the sensor data to a corresponding likelihood of the device slipping. For example, such analysis can be based on comparing the current sensor data to historical data regarding the user which includes past detection of moisture and/or past detections of the user grip pattern and the result of whether the device slipped or not. Additionally, in some embodiments, the analysis can be based on data detected from other devices, such as through crowdsourcing of data regarding presence of liquid and user grip patterns with corresponding results of slipping or not. In addition, the likelihood of the device slipping can be based on moisture sensor data alone, pressure sensor data alone or a combination of moisture sensor data and pressure sensor data.

At 606, a surface profile of a surface panel of the device is altered based on the determined likelihood of the device slipping from the grip of the user. For example, in some embodiments, the surface panel has two surface profile states: a smooth state and a relatively rough state compared to the smooth state. In such embodiments, the surface profile can be altered from the smooth state to the rough state in response to determining that it is likely that the device will slip or the surface profile can be altered from the rough state to the smooth state in response to a determination that the device is not likely to slip. In other embodiments, the surface panel can have more than two surface profile states, where each state has a different roughness compared to the other states. Thus, the different profile states can provide a range of roughness or grip varying from a smooth state through one or more intermediate states until a maximum roughness state. In such embodiments, each of the more than two surface profile states can correspond to a different degree of likelihood of slipping, as discussed above.

Furthermore, as discussed above, in some embodiments, the surface panel is a microfluidic panel. A controller can alter the surface profile of the surface panel in such embodiments by outputting signals to control the release of fluid in the microfluidic panel to create bumps, as discussed above. In other embodiments, the surface panel can be implemented as a pressure creation module and a polymer material comprising a first polymer having a first stiffness and a second polymer embedded within the first polymer in a pre-determined pattern where the second polymer has a second stiffness which is relatively stiffer than the first stiffness. In such embodiments, a controller can alter the surface profile of the surface panel by outputting signals to the pressure creation module to apply pressure to the polymer material such that the surface profile of the polymer material changes according to the pre-determined pattern of the second polymer embedded within the first polymer.

Thus, the embodiments described herein enable a device to dynamically change the surface profile of one or more surfaces of the device such that a user is able to maintain a better grip on the device and reduce slipping while at the same time improving the aesthetics of the device by not requiring the addition of third party components to the device which can result in a more bulky device and/or negatively affect the appearance of the device. Furthermore, in some embodiments, machine learning can be employed to improve the ability of the device through user feedback to predict when the device may slip and, thus, react appropriately to reduce the likelihood of slipping.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Although specific embodiments have been illustrated and described herein, it will be appreciated by those of ordinary skill in the art that any arrangement, which is calculated to achieve the same purpose, may be substituted for the specific embodiments shown. Therefore, it is manifestly intended that this invention be limited only by the claims and the equivalents thereof.

What is claimed is:

1. A method comprising:
    receiving moisture sensor data from at least one moisture sensor located in a device, the at least one moisture sensor configured to detect moisture on a surface of the device;
    determining a likelihood of the device slipping from a grip of a user based on the received moisture sensor data; and
    altering a surface profile of a surface panel of the device based on the determined likelihood of the device slipping from the grip of the user.

2. The method of claim 1, further comprising:
    receiving pressure sensor data from at least one pressure sensor located in the device, the at least one pressure sensor configured to detect a grip pattern of the user; and
    wherein determining the likelihood of the device slipping comprises determining the likelihood of the device slipping based on the received moisture sensor data and on the received pressure sensor data.

3. The method of claim 2, wherein determining the likelihood of the device slipping from the grip of the user comprises comparing the received moisture sensor data and received pressure sensor data to historical data including past detected moisture and past detected grip patterns of the user.

4. The method of claim 1, wherein the surface panel has two surface profile states and wherein altering the surface profile based on the determined likelihood of the device slipping includes selecting one of the two surface profile states corresponding to the determined likelihood of the device slipping.

5. The method of claim 1, wherein the surface panel has more than two surface profile states, wherein altering the surface profile based on the determined likelihood of the device slipping includes selecting one of the more than two surface profile states corresponding to the determined likelihood of the device slipping.

6. The method of claim 1, wherein the surface panel is a microfluidic panel; and wherein altering the surface profile of the surface panel comprises controlling release of a fluid stored in one or more reservoirs of the microfluidic panel into a plurality of pipes of the microfluidic panel to cause one or more bumps to form in a flexible surface material of the microfluidic panel.

7. The method of claim 1, wherein the surface panel includes a polymer material comprising a first polymer having a first stiffness and a second polymer embedded within the first polymer in a pre-determined pattern, the second polymer having a second stiffness which is relatively stiffer than the first stiffness; and wherein altering the surface profile of the surface panel comprises sending a signal to a pressure creation module to apply pressure to the polymer material such that the surface profile of the polymer material changes according to the pre-determined pattern of the second polymer embedded within the first polymer.

8. A system comprising:
at least one moisture sensor configured to detect presence of moisture on a surface of a device;
a surface panel embedded within a surface of the device; and
a controller configured to determine a likelihood of the device slipping from a grip of a user based on moisture sensor data received from the at least one moisture sensor; and
wherein the controller is further configured to alter the surface profile of the surface panel based on the determined likelihood of the device slipping from a grip of a user.

9. The system of claim 8, wherein the system further comprises at least one pressure sensor located in the device, the at least one pressure sensor configured to detect a grip pattern of the user; and
wherein the controller is configured to determine the likelihood of the device slipping based on the moisture sensor data and on the grip pattern of the user detected by the at least one pressure sensor.

10. The system of claim 9, wherein the controller is configured to determine the likelihood of the device slipping from the grip of the user by comparing the moisture sensor data and detected grip pattern of the user to historical data including past detected moisture and past detected grip patterns of the user.

11. The system of claim 8, wherein the surface panel has two surface profile states and wherein the controller is configured to select one of the two surface profile states based on the determined likelihood of the device slipping.

12. The system of claim 8, wherein the surface panel has more than two surface profile states, wherein the controller is configured to select one of the more than two surface profile states corresponding to the determined likelihood of the device slipping.

13. The system of claim 8, wherein the surface panel is a microfluidic panel; and wherein the controller is configured to alter the surface profile of the surface panel by controlling release of a fluid stored in one or more reservoirs of the microfluidic panel into a plurality of pipes of the microfluidic panel to cause one or more bumps to form in a flexible surface material of the microfluidic panel.

14. The system of claim 8, wherein the surface panel includes a pressure creation module and a polymer material comprising a first polymer having a first stiffness and a second polymer embedded within the first polymer in a pre-determined pattern, the second polymer having a second stiffness which is relatively stiffer than the first stiffness; and
wherein the controller is configured to alter the surface profile of the surface panel by sending a signal to a pressure creation module to apply pressure to the polymer material such that the surface profile of the polymer material changes according to the pre-determined pattern of the second polymer embedded within the first polymer.

15. A computer program product comprising a computer readable storage medium having a computer readable program stored therein, wherein the computer readable program, when executed by a processor, causes the processor to:
receive moisture sensor data from at least one moisture sensor located in a device, the at least one moisture sensor configured to detect moisture on a surface of the device;
determine a likelihood of the device slipping from a grip of a user based on the received moisture sensor data; and
output signals to alter a surface profile of a surface panel of the device based on the determined likelihood of the device slipping from the grip of the user, wherein the altering the surface profile changes a coarseness of the surface panel of the device.

16. The computer program product of claim 15, wherein the computer readable program further causes the processor to:
receive pressure sensor data from at least one pressure sensor located in the device, the at least one pressure sensor configured to detect a grip pattern of the user; and
determine the likelihood of the device slipping based on the received moisture sensor data and on the received pressure sensor data.

17. The computer program product of claim 16, wherein the computer readable program is further configured to cause the processor to determine the likelihood of the device slipping from the grip of the user comprises by comparing the received moisture sensor data and received pressure sensor data to historical data including past detected moisture and past detected grip patterns of the user.

18. The computer program product of claim 15, wherein the surface panel has two or more surface profile states, wherein the computer readable program is further configured to cause the processor to select one of the two or more surface profile states corresponding to the determined likelihood of the device slipping.

19. The computer program product of claim 15, wherein the surface panel is a microfluidic panel; and
wherein the computer program product is configured to cause the processor to output signals to alter the surface profile of the surface panel by outputting signals to control release of a fluid stored in one or more reservoirs of the microfluidic panel into a plurality of pipes of the microfluidic panel which causes one or more bumps to form in a flexible surface material of the microfluidic panel.

20. The computer program product of claim 15, wherein the surface panel includes a polymer material comprising a first polymer having a first stiffness and a second polymer embedded within the first polymer in a pre-determined pattern, the second polymer having a second stiffness which is relatively stiffer than the first stiffness; and
wherein the computer program product is configured to cause the processor to output signals to alter the surface profile of the surface panel by outputting a signal to a pressure creation module to apply pressure to the polymer material such that the surface profile of the polymer material changes according to the pre-determined pattern of the second polymer embedded within the first polymer.

* * * * *